United States Patent
Windorfer

(10) Patent No.: US 9,346,325 B2
(45) Date of Patent: May 24, 2016

(54) AUTOMATICALLY TRAVELING FLOOR DUST COLLECTING APPLIANCE, AND RUNNING WHEEL, IN PARTICULAR FOR A FLOOR DUST COLLECTING APPLIANCE

(71) Applicant: Vorwerk & Co. Interholding GmbH, Wuppertal (DE)

(72) Inventor: Harald Windorfer, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 379 days.

(21) Appl. No.: 14/016,299

(22) Filed: Sep. 3, 2013

(65) Prior Publication Data
US 2014/0060716 A1 Mar. 6, 2014

(30) Foreign Application Priority Data
Sep. 4, 2012 (DE) .......................... 10 2012 108 189

(51) Int. Cl.
| | |
|---|---|
| B60C 7/24 | (2006.01) |
| B60C 11/11 | (2006.01) |
| B60C 11/13 | (2006.01) |
| A47L 9/00 | (2006.01) |

(52) U.S. Cl.
CPC .................. *B60C 11/11* (2013.01); *A47L 9/009* (2013.01); *B60C 7/24* (2013.01); *B60C 11/1392* (2013.04); *A47L 2201/00* (2013.01)

(58) Field of Classification Search
CPC ...... B60C 7/10; B60C 11/01; B60C 11/0311; B60C 11/11; B60C 11/1376; B60C 11/1392; B60C 7/24; A47L 9/009
USPC ........................... 152/209.12, 209.15, 209.16
See application file for complete search history.

(56) References Cited

U.S. PATENT DOCUMENTS

| | | | | |
|---|---|---|---|---|
| 1,021,816 | A * | 4/1912 | Barker | B60C 11/0311 152/209.12 |
| 2,180,649 | A * | 11/1939 | White | B29D 30/54 152/179 |
| D169,857 | S * | 6/1953 | Klint | 152/209.12 |
| 4,222,424 | A * | 9/1980 | Tsuzura | B60C 11/0311 152/209.12 |
| 6,633,150 | B1 | 10/2003 | Wallach et al. | |
| 8,191,593 | B2 * | 6/2012 | Mayer | B29D 30/02 152/209.15 |
| 8,714,220 | B2 * | 5/2014 | Tso | F16H 55/171 152/375 |
| 8,911,025 | B2 * | 12/2014 | Rota | B60C 7/10 152/379.3 |
| 9,108,469 | B2 * | 8/2015 | Wallet | B60C 11/0311 |
| 2005/0251947 | A1 * | 11/2005 | Lee | A47L 9/009 15/319 |
| 2013/0274861 | A1 * | 10/2013 | Kelly | A61F 2/07 623/1.13 |

FOREIGN PATENT DOCUMENTS

| | | |
|---|---|---|
| DE | 10 2008 009 617 A1 | 8/2009 |
| JP | 54000303 A * | 1/1979 |
| JP | 61016102 A * | 1/1986 |

* cited by examiner

*Primary Examiner* — Kip T Kotter
(74) *Attorney, Agent, or Firm* — Collard & Roe, P.C.

(57) ABSTRACT

An automatically traveling floor dust collecting appliance has at least one running wheel having an axis of rotation, a hub, and a tire forming a tire contact area merging radially inwardly into two oppositely situated side faces. The tire, which includes elastic material, has profile blocks, each forming a part of the tire contact area and provided one after the other in the peripheral direction. A running wheel is also provided, in particular for a floor dust collecting appliance. The part of the tire contact area formed by a profile block has a profile which in its cross-section slopes downwardly toward the center. This profile block at the same time forms a part of an associated side face. The profile block, at this transition, radially and in the direction of the axis of rotation, forms a farthest protruding portion of the tire contact area of the tire.

10 Claims, 5 Drawing Sheets

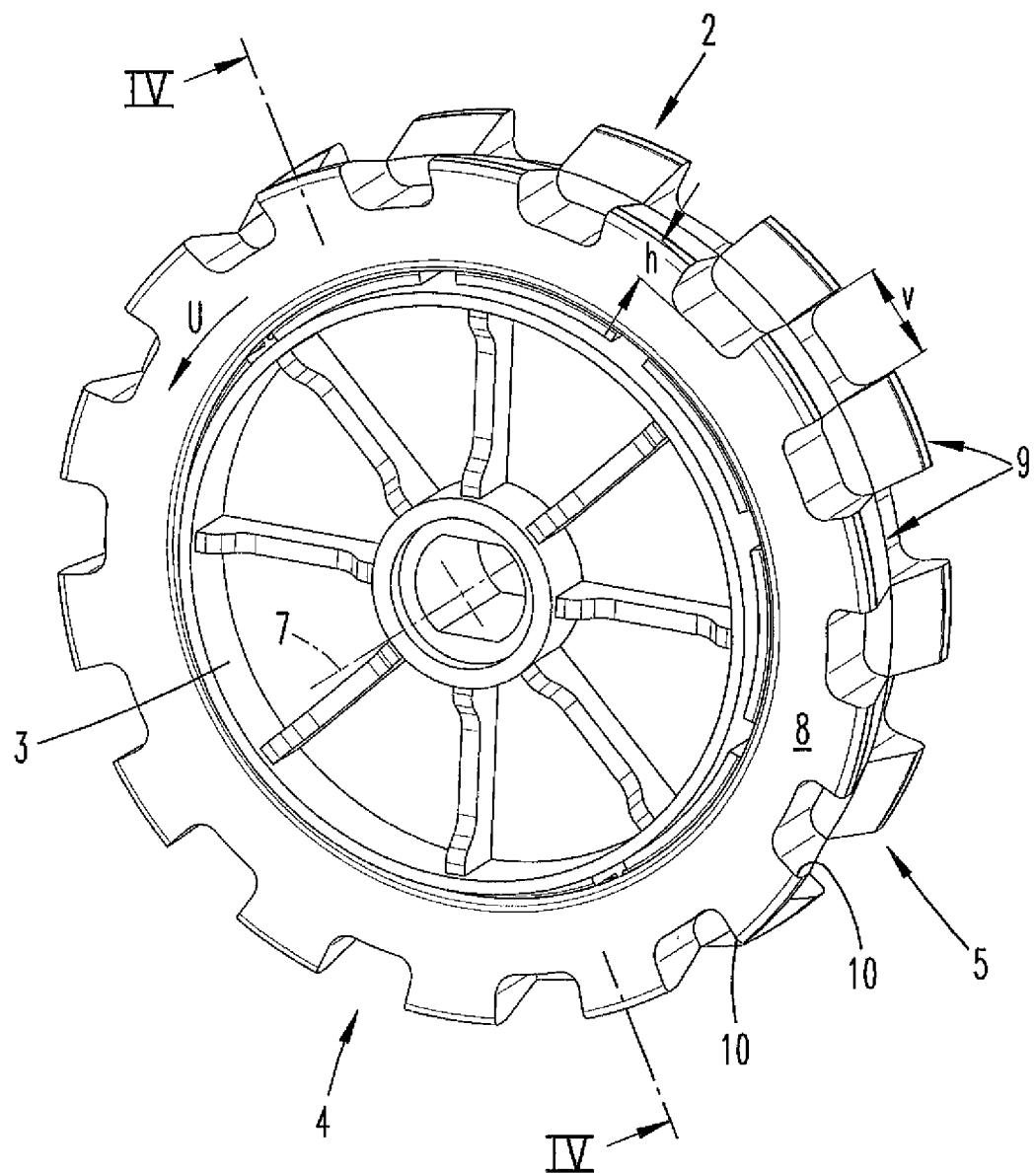

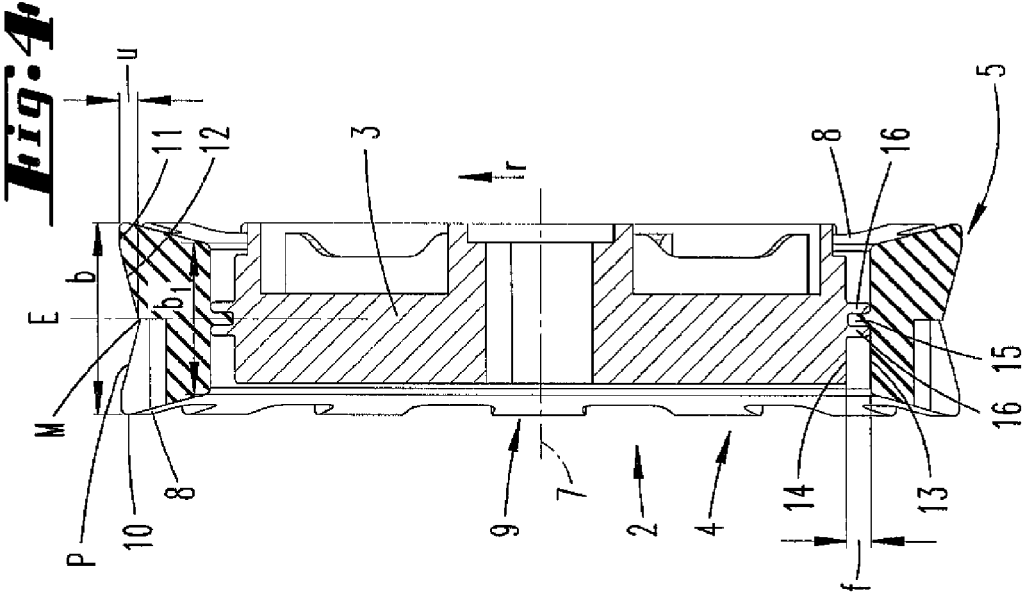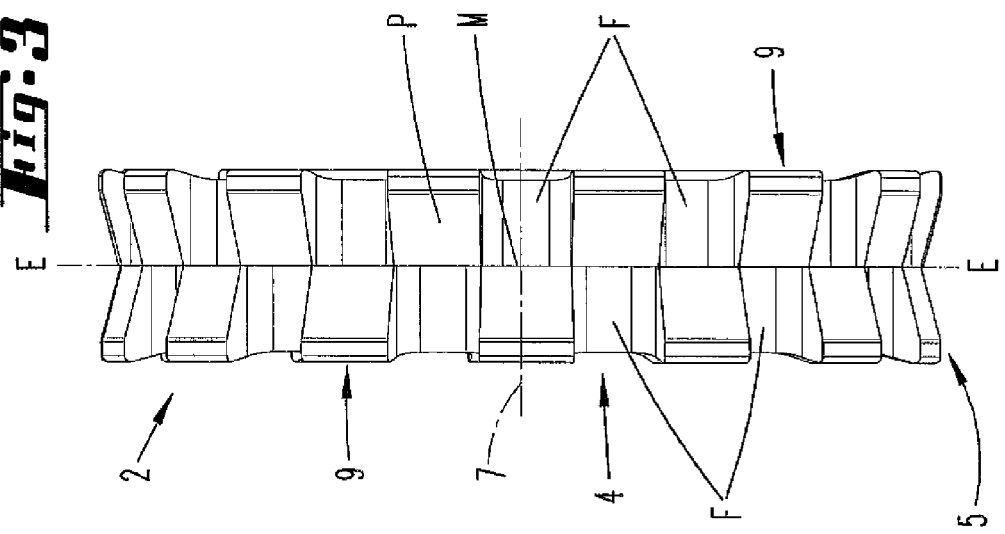

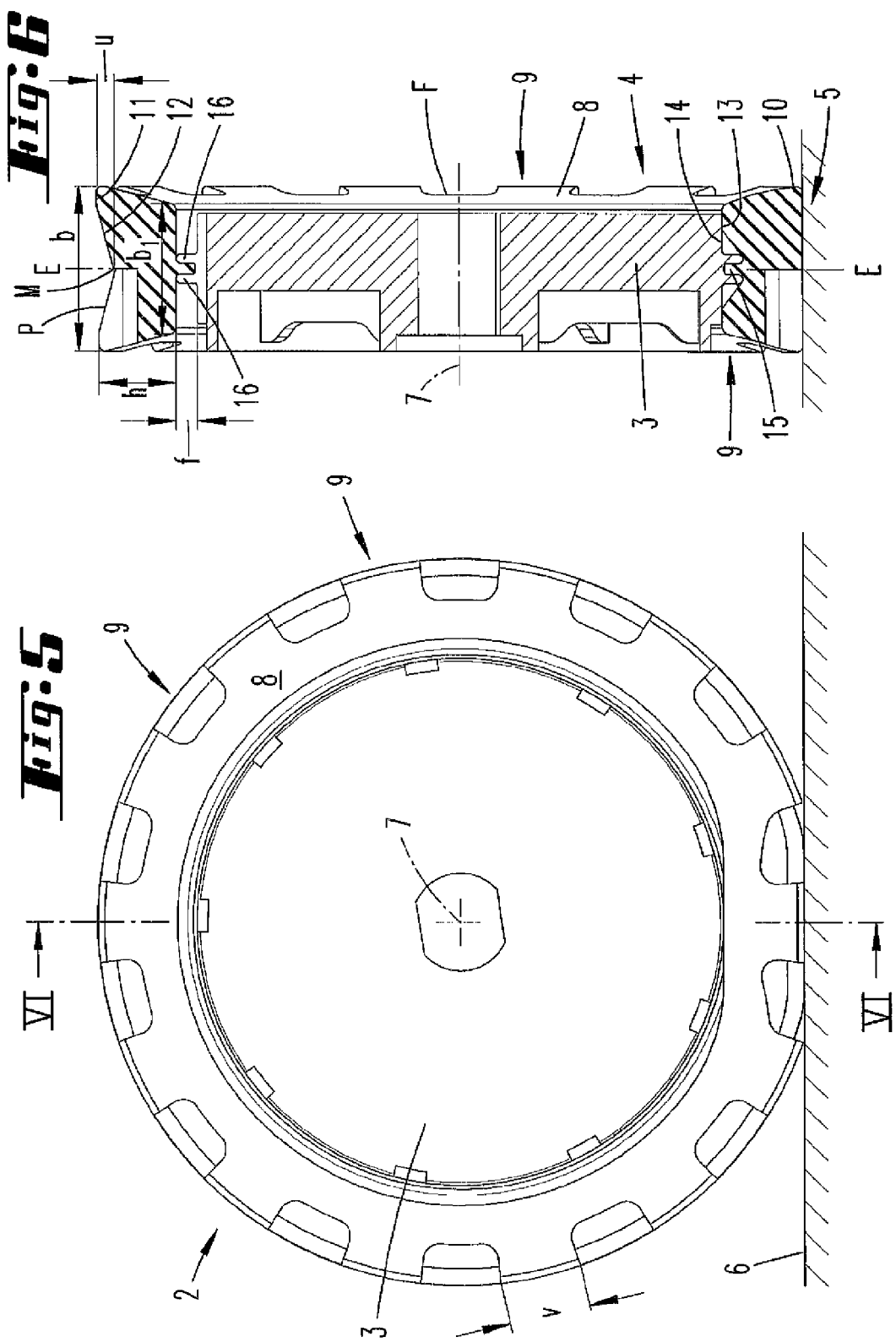

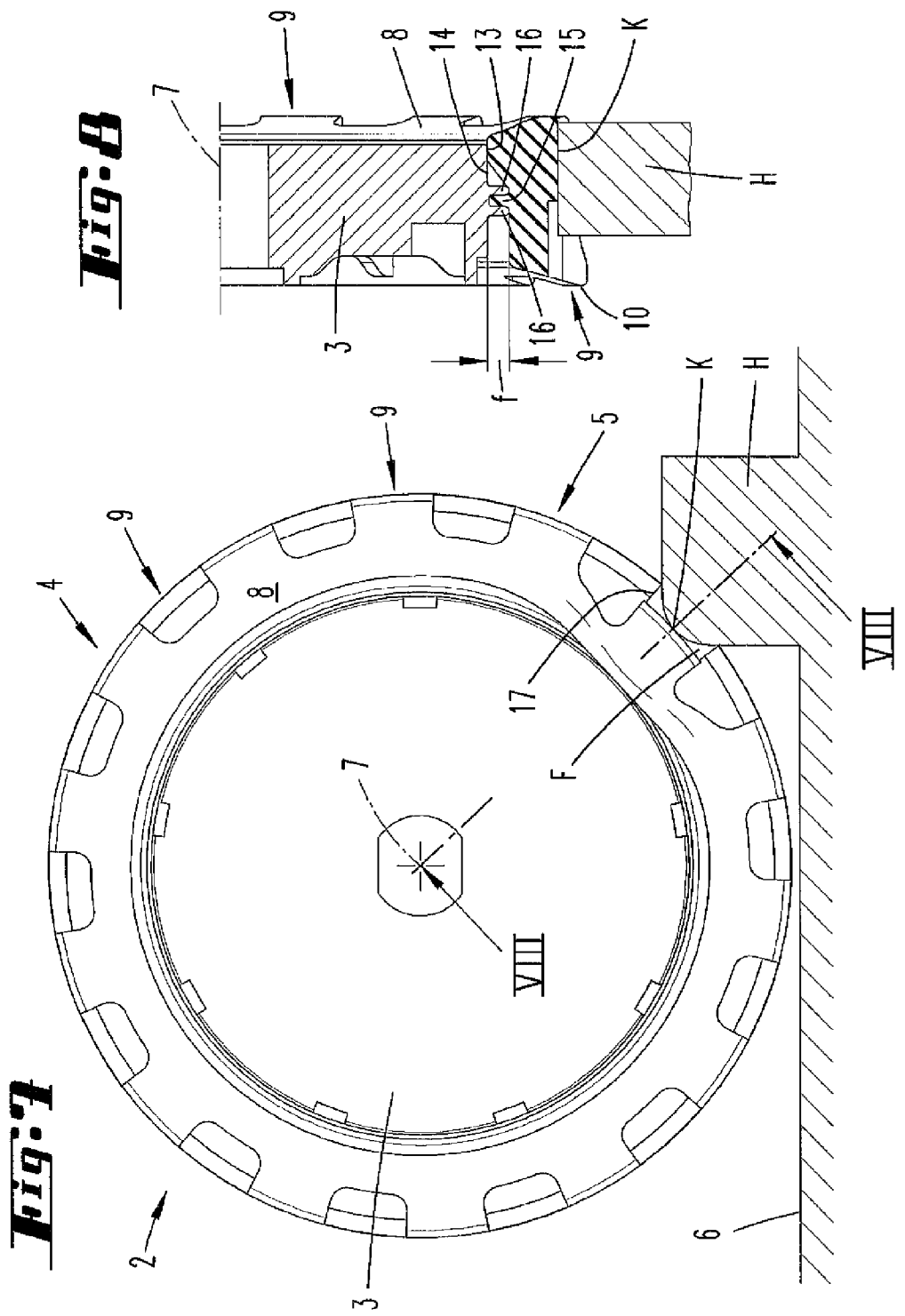

AUTOMATICALLY TRAVELING FLOOR DUST COLLECTING APPLIANCE, AND RUNNING WHEEL, IN PARTICULAR FOR A FLOOR DUST COLLECTING APPLIANCE

CROSS REFERENCE TO RELATED APPLICATIONS

Applicant claims priority under 35 U.S.C. §119 of German Application No. 10 2012 108 189.1 filed Sep. 4, 2012, the disclosure of which is incorporated by reference.

BACKGROUND OF THE INVENTION

1. Field of the Invention

The invention relates in first instance to an automatically traveling floor dust collecting appliance having at least one driven running wheel, the running wheel having an axis of rotation, a hub, and a tire which forms a tire contact area, in addition the tire contact area merging radially inwardly into two oppositely situated side faces, and the tire, which comprises elastic material, having profile blocks, which in each case form a part of the tire contact area and are provided one after the other in the peripheral direction.

The invention further relates to a running wheel having an axis of rotation, a hub, and a tire which forms a tire contact area, the tire contact area merging radially inwardly into two oppositely situated side faces, and the tire, which comprises elastic material, having profile blocks, which in each case form a part of the tire contact area and are provided one after the other in the peripheral direction.

2. Description of the Related Art

These types of automatically traveling floor dust collecting appliances and running wheels are already widely known. Reference is made to DE 10 2008 009 617 A1 and U.S. Pat. No. 6,633,150 B1, for example.

SUMMARY OF THE INVENTION

It is an object of the invention to provide an automatically traveling floor dust collecting appliance and a running wheel in which a design has been found which is favorable in particular with regard to overcoming obstacles.

A possible approach to achieving the object is provided according to a first inventive concept for an automatically traveling floor dust collecting appliance, in which a profile block at the same time forms a part of an associated side face which, due to the part of the tire contact area formed by the profile block, starting from a transition to the side face, has a profile which in its cross-section slopes downwardly toward the opposite side face, and the profile block, at this transition, radially and in the direction of the axis of rotation, forms a farthest protruding portion of the tire contact area of the tire.

Likewise, a possible approach to achieving the object is provided by a running wheel having a design with the above-mentioned features.

Due to the profile block forming a part of the tire contact area and in its cross-section sloping downwardly toward the opposite side face, this results in a protruding portion of the profile block, associated with the side face, which on account of the clearance provided for a profile block allows a favorable claw-like grip during interaction with an obstacle such as edge or step when a load on the profile block occurs substantially in the peripheral direction of the tire. Because the material of the tire is elastic, when such a profile block contacts the floor this results in a flattening of the profile, and thus a larger contact surface, due to the load which customarily acts. At the same time, this occurs starting from the area of the tire which, radially and in the direction of the axis of rotation, protrudes farthest, which advantageously may contribute overall to the stability of travel.

Further features of the invention are described and illustrated below, also in the description of the figures and in the drawings, often in their preferred association with the concept explained above, but may also be of importance in an association with only one or more individual features which are described herein or illustrated in the drawings, or independently or in some other overall concept.

It is thus preferred that, relative to a center of the tire contact area present in the direction of the axis of rotation, the part of the tire contact area formed by the profile block slopes downwardly toward the center. An (individual) profile block thus forms approximately one-half of the tire contact area, relative to the cross-section. As a result of providing the slope toward the center, a correspondingly variable enlargement region of the portions of the tire contact area actually in contact with a floor is provided. In this regard it is preferred that, due to the elasticity of the material for a customary weight of the appliance on which the running wheel is present, practically the entire part, at least based on the mentioned cross-section, of the tire contact area formed by such a profile block also rests on the floor.

In further detail, it is preferred that profile blocks are provided which are oppositely situated relative to the mentioned center. In addition, these oppositely situated profile blocks preferably have the same design, and in particular preferably have identical base areas. It is further preferred that the contour and/or extent of the profile blocks in the direction of the axis of rotation and/or in the radial direction relative to the axis of rotation is/are in each case identical.

In further detail, these oppositely situated profile blocks may be offset with respect to one another in the peripheral direction. In this regard, in first instance an overlapping arrangement may be provided, so that in a side view, viewed in the direction of the axis of rotation of the wheel, one of the two profile blocks is partially overlapped by the other. The degree of overlap in the peripheral direction may correspond, for example, to one-tenth to two-thirds of the extent of a profile block in the peripheral direction. However, in this regard it is preferred that the oppositely situated profile blocks are offset in the peripheral direction in such a way that in the mentioned side view, essentially both profile blocks are completely defined by their respective face.

Due to the tire being formed from an elastic material such as a rubber compound or a thermoplastic elastomer, and the forming processes in this regard, slight dimensional inaccuracies are always present.

In addition, it is preferred that a profile block in its cross-section extends from the particular side face to the center. In this respect, one-half of the profile, preferably in each case, is occupied by a profile block. Two oppositely situated profile blocks in their cross-section correspondingly together form the profile line. Due to the offset of the profile blocks relative to one another in the peripheral direction, in which both oppositely situated profile blocks at the same time are represented as an interface plane, preferably no, or essentially only one, cross-sectional area is present.

It is also preferred that a profile block has a rectangular layout in top view. In this regard, a configuration having sides of equal length may be provided, i.e., a design of a profile block which is square in top view.

With regard to a side face, it is preferred that the side face extends substantially linearly in cross-section. The side face also preferably tapers toward the mentioned center, starting from the transition into the tire contact area, so that, viewed in cross-section, a contour of the tire results which opens conically outwardly from the axis of rotation. In the regions in which no profile block is formed in the peripheral direction, the configuration is preferably provided in such a way that, relative to the mentioned cross-section, a step surface results which extends to the center. The step surface, in its cross-section, is also preferably provided extending approximately parallel to the axis of rotation. The vertical face of the step accordingly comes about preferably in the mentioned center. The vertical face preferably radially outwardly merges directly into the tire contact area formed by a profile block. The lowering of the step surface with respect to the largest dimension of lowering of a profile block, starting from the portion which is, radially and in the direction of the axis of rotation, farthest protruding, results in approximately one-half to three times this dimension.

It is further preferred that a profile block or a tire portion in this regard, starting from the side face on the bottom and facing the hub, has an extent portion having a clearance from an associated shoulder portion of the hub. Under appropriate stress, this clearance allows an overall radially inwardly elastic deformation of the associated tire portion. This favors the described forming of a larger contact area when a corresponding portion of the tire comes to rest on the floor in the customary travel mode.

In particular, the elasticity of the material is preferably selected in such a way that in the load state, in the case of the mentioned customary travel, i.e., the contact of the tire contact area on the floor while carrying the relevant load of the appliance, the extent portion is provided with support by the shoulder portion. The extent portion comes to rest on the support. In this regard, it may be provided that the design is such that the extent portion essentially completely comes to rest. However, the extent portion may also come to rest, relative to a dimension of the extent portion in the direction of the axis of rotation, at one-tenth to approximately eight-tenths of the dimension.

An extent of the tire in the direction of the axis of rotation in the area of the profile blocks, i.e., in particular starting outwardly radially from an extent portion, is preferably twice the extent in this regard of a profile block. The profile block widens outwards correspondingly, in the radial direction, at approximately half the radial dimension of the tire, from the tire in the provided clearance.

It is also preferred that the tire has a radially inwardly protruding mounting formation on the hub side. In addition, the tire preferably is also supported essentially only by this mounting formation, except for a state in which an extent portion is provided with support on a shoulder portion.

A mounting formation may be formed as a rib which extends in the peripheral direction. In this regard, the mounting formation may be provided continuously or in portions. The mounting formation also preferably extends in a protruding manner with respect to an extent portion, in the radial direction relative to the nonloaded state.

In addition, the mounting formation is preferably accommodated in a groove formed by two circumferential ribs of the hub separated by a distance in the direction of the axis of rotation. The end faces of these ribs may also assist in supporting the tire, whereby this end face may optionally rest against a portion of an extent area which is small in comparison.

With regard to the disclosure, the ranges, i.e., value ranges or multiple ranges, stated previously and below also include all values in between, in particular in one-tenth increments of the particular dimension, or if applicable, also for the case of dimensionless values, i.e., for example one-tenth of a length, width etc., or of an X multiple. If, for example, reference is made to one-fourth to three-fourths of a length, width, or the like of another part, a range of 0.275 to 0.75 or 0.275 to 0.725 or 0.25 to 0.75 or 0.3 to 0.75, etc. is likewise included in the disclosure. This disclosure serves on the one hand for delimiting the mentioned range limits from below and/or above, as also stated by way of example, but alternatively or additionally, also with regard to the disclosure of one or more single values from a particular stated range.

BRIEF DESCRIPTION OF THE DRAWINGS

The invention is explained in greater detail below with reference to the appended drawings, which however illustrate only one exemplary embodiment. The drawings show the following:

FIG. 2 shows a perspective view of a running wheel;

FIG. 3 shows a top view of the running wheel according to FIG. 2;

FIG. 4 shows a cross-section along the line IV-IV in FIG. 2;

FIG. 5 shows a side view of the running wheel in the loaded state;

FIG. 6 shows a cross-section through the object according to FIG. 5, sectioned along the line VI-VI;

FIG. 7 shows the object according to FIG. 5 in interaction with a step-shaped obstacle; and FIG. 8 shows a cross-section of the object according to FIG. 7, sectioned along the line VIII-VIII.

DETAILED DESCRIPTION OF PREFERRED EMBODIMENTS

Figure 1:
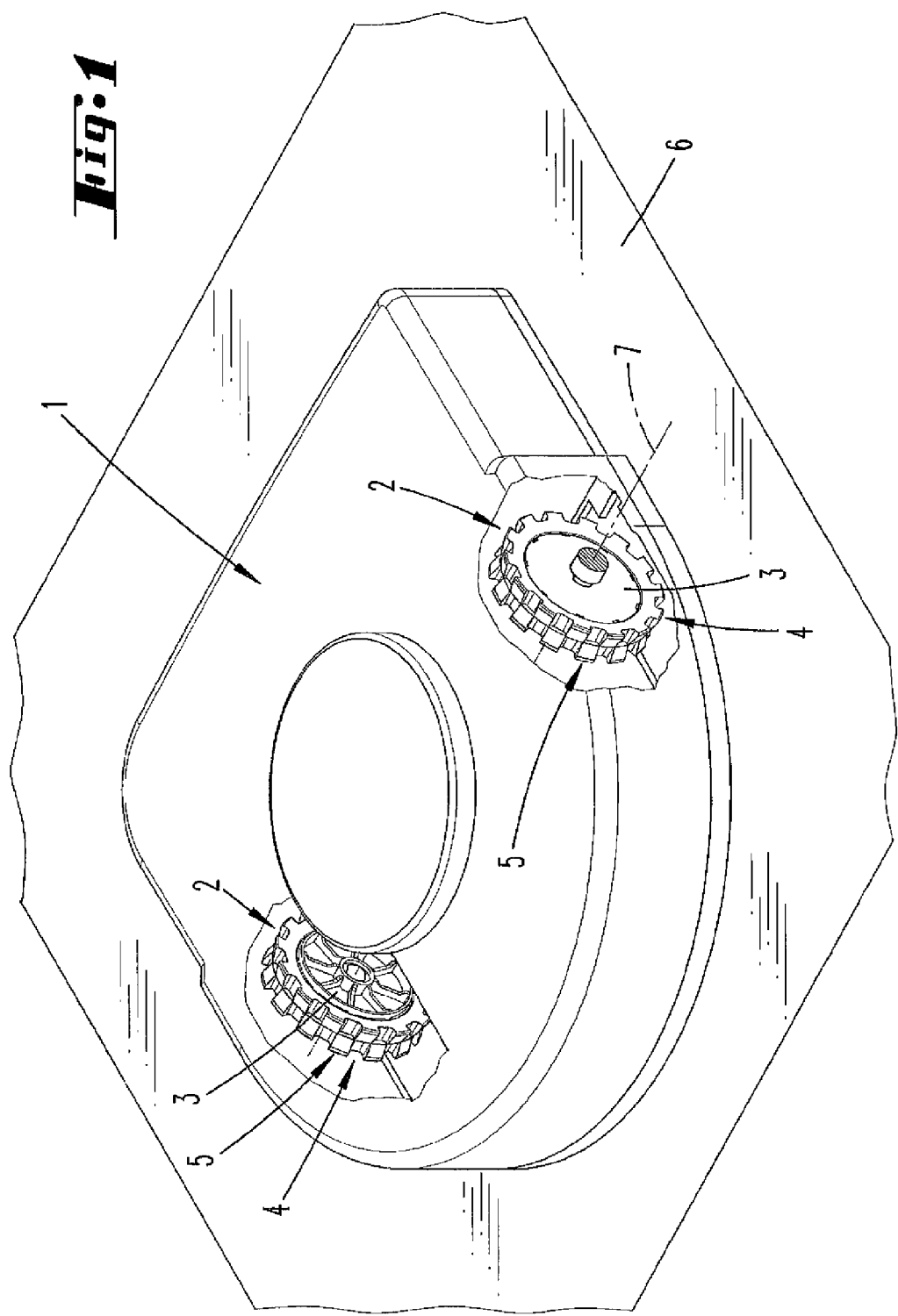
FIG. 1 shows an illustration of a floor dust collecting appliance by way of example, partially cut away in the region of the running wheels.

An automatically traveling floor dust collecting appliance 1, which in the exemplary embodiment has two running wheels 2, is illustrated and described with reference to FIG. 1. One or both of the running wheels 2 may be driven. This type of running wheel 2, to which reference is made in FIGS. 2 through 8 which follow, in particular has a hub 3 and a tire 4. At its periphery the tire 4 forms a tire contact area 5. The tire contact area 5 refers to the part of the tire 4 which comes into contact with a floor 6 in the course of a revolution of the wheel during normal use, optionally accompanied by load which exceeds the customary load. At the center of the hub 3, a running wheel 2 also has an actual or geometric axis of rotation 7.

The tire contact area 5 merges radially inwardly, viewed in the direction of the axis of rotation 7, into two oppositely situated side faces 8. The tire is made of an elastic material, as is customary for tires. The elastic material may be rubber, a rubber compound, or a thermoplastic elastomer, for example. The tire contact area 5 is at least partially formed by profile blocks 9. The profile blocks 9 are provided one after the other in a peripheral direction U of the tire 4. In the illustrated exemplary embodiment and preferably, under customary travel load and without the special case of an interaction of the tire with an obstacle, the tire contact area is provided only by the profile blocks 9, accordingly by their radially outer end faces. The profile blocks 9, together with further surfaces of the tire facing in the radial direction (in the illustrated exemplary embodiment, the intermediate surfaces F, described in greater detail below), form a tire peripheral surface. At least in theory, practically any area of the tire peripheral surface may come into contact with a floor or an obstacle, and therefore also areas outside the end faces of the profile blocks 9 may become part of the tire contact area 5, at least temporarily.

The part of the tire contact area 5 formed by a profile block 9 has a profile which in its cross-section slopes downwardly with respect to the center of the tire 4 (see FIG. 4, for example). In this regard, the center of the tire 4 is provided by a plane E which extends perpendicularly with respect to the axis of rotation 7, and which extends centrally relative to a largest width b of the tire, as shown in the cross-section according to FIG. 4. At the same time, a profile block 9 forms part of an associated side face 8. At the transition of the area of a profile block 9, which forms a part of the tire contact area 5, into a side face 8, this profile block 9 radially forms a farthest protruding portion of the tire contact area 5, in a radial direction r starting from the axis of rotation 7, and in the direction of the axis of rotation 7. Specifically, an overhanging profile corner 10 is formed by such a profile block 9.

Profile blocks 9 which are oppositely situated in relation to the mentioned center M are formed in the tire 4. In particular and preferably, in a cross-sectional view, only one profile block 9 in each case is formed on either side of the center M.

These oppositely situated profile blocks 9, regardless of whether only one is formed in each case, are also preferably offset with respect to one another in the peripheral direction U of the tire 4. In the exemplary embodiment, an offset dimension v, viewed in the peripheral direction U, corresponds to a length of a profile block 9 viewed in this direction. However, the offset dimension may also be smaller, for example corresponding to only one-tenth to nine-tenths of this length of the profile block 9. With reference in particular to an embodiment in which, starting from the center, only two profile blocks 9 which are oppositely situated in a cross-sectional view are provided, in this cross-section a profile block 9 also preferably extends from the particular side face 8 to the center M.

A free-standing height h of a profile block 9, which corresponds to the distance from an intermediate surface F, which is lowered in the peripheral direction U between two profile blocks 9 which are the same relative to the center M, i.e., situated on the same side of the center, to the particular point of the tire contact area 5 in the nonloaded state, preferably corresponds to one-tenth to nine-tenths, particularly preferably approximately two-tenths to four-tenths, of the width b of the tire 4, based on the profile corner 10.

In addition, in particular in a top view (see FIG. 3, for example), a profile block 9 may have a rectangular cross-section. The cross-section is also at least approximately square.

The profile P of the tire contact area 5, starting from a transition into a side face 8 (compare again FIG. 6, for example, in this regard), in first instance has an outer portion 11 which preferably extends linearly or with only a slight drop toward the center M, optionally also slightly rising toward the center M. The outer portion 11 then merges into a connecting portion 12 preferably in the sense of a straight line, sloping downwardly toward the center M. Thus, starting from the center M, this results in an outwardly directed increase in elevation u of the profile P which corresponds, for example, to approximately one-fourth to three-fourths, preferably approximately one-third, of the height h of a profile block in the area of the profile corner 10.

A side face 8 of the tire 4 has two areas which are to be distinguished from one another. Starting from radially inwardly, from a start of the tire 4 (in this case, provided by the extent portion 13 explained in greater detail below) to a peripheral plane which is formed by the intermediate surface F, in first instance this results in a continuous surface band which in a side view is not affected with regard to the periphery. In addition, in the peripheral direction, a side face 8 is formed by a profile block 9 in each case, resulting in crenellated shoulders.

A side face 8 preferably extends substantially linearly relative to a cross-section.

The hub 3 is preferably in contact with only a fairly small surface area of the tire 4 relative to the width b, at least with regard to a nonloaded state. As is apparent from FIG. 4, for example, the contact with the hub 3 in the width direction is only approximately one-tenth to three-tenths of the width $b_1$, relative to the width $b_1$ of the tire 4 directly facing the hub 3. In any event, it is preferred that the contact is only approximately one-fourth to three-fourths of the width $b_1$.

This results in an extent portion 13 of the tire 4 on one or both sides, relative to the center M, which has a clearance f with respect to an associated shoulder portion 14 of the hub 3. This clearance f arises in the direction of the axis of rotation and based on a cross-section, as represented in FIG. 4, for example.

The size of the clearance f, i.e., the free radial dimension thus resulting between the shoulder portion 14 and the extent portion 13 of the running wheel, is preferably selected in such a way that for customary travel of the appliance, the extent portion is provided with support by the shoulder portion. This is apparent at the bottom portion of FIG. 6, for example.

In further detail, the tire 4 has a radially inwardly protruding mounting formation 15, preferably on the hub side, for mounting on the hub 3. In another preferred embodiment, this mounting formation is formed as a rib which extends in the peripheral direction U. In this regard, the mounting formation 15 may be provided with interruptions. The mounting formation 15 is formed so as to protrude radially inwardly with respect to the extent portion 13. In this regard, a mounting receptacle is provided on the hub 3. This mounting receptacle is preferably formed by two circumferential projections 16 which likewise are rib-like. A groove is formed between the rib-like projections 16; the dimensions of the groove may correspond to the free dimension of a mounting formation 15. The projections 16 may also extend with interruptions in the peripheral direction. In addition, a projection 16 may be provided in alternation relative to the side faces of the mounting formation 15, viewed over the periphery, so that in any particular cross-section (except for any overlap in the peripheral direction) only one projection 16 is ever formed.

It is self-evident that the above statements are similarly of importance with regard to the subject matter of a running wheel 2 as such, except that in this case the further features pertaining to a floor cleaning appliance, in particular an automatically traveling floor cleaning appliance, are not present.

The mode of operation of the running wheel 2 is explained in greater detail with reference to FIGS. 7 and 8.

Upon running onto a step-like obstacle H having an edge radius which is small in relation to the running wheel 2, in the configuration illustrated in FIGS. 7 and 8 only one profile block 9 comes into engagement with the edge K of the obstacle H. Due to the softness of the profile block 9, it is squeezed radially inwardly, as is apparent from FIG. 8. The edge K enters the space between two profile blocks 9, for example up to the surface F. This results, in a manner of speaking, in a gear wheel-like situation of the tire 4 with respect to the edge K. An end face 17 of a profile block 9 pointing in the peripheral direction U engages over the edge K. Since the stress in the peripheral direction U is different from a stress which acts radially inwardly toward the center, in this case the softness or elasticity of the material does not act in the same way. Accordingly, this results, in a manner of speaking, in a gear wheel-like engagement which allows the running wheel 2 to grip in a claw-like manner on the edge K and thus lift, as a whole, the floor dust collecting appliance 1, on which the running wheel 2 is optionally mounted. In addition, this may result in arching of the tire and in particular of the affected profile block 9, relative to the side face 8 in particular of the affected profile block 9, as also illustrated in FIG. 8. In this regard, a certain arching also results during customary operation (see FIG. 6).

All features disclosed are (in themselves) pertinent to the invention. The disclosure content of the associated priority document is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

LIST OF REFERENCE NUMERALS

| | |
|---|---|
| 1 | Floor dust collecting appliance |
| 2 | Running wheel |
| 3 | Hub |
| 4 | Tire |
| 5 | Tire contact area |
| 6 | Floor |
| 7 | Axis of rotation |
| 8 | Side face |
| 9 | Profile block |
| 10 | Profile corner |
| 11 | Outer portion |
| 12 | Connecting portion |
| 13 | Extent portion |
| 14 | Shoulder portion |
| 15 | Mounting formation |
| 16 | Projection |
| 17 | End face |
| b | Width |
| $b_1$ | Width |
| E | Plane |
| F | Surface |
| f | Clearance |
| F | Intermediate surface |
| H | Obstacle |
| h | Height |
| K | Edge |
| M | Center |
| P | Profile |
| r | Radial direction |
| U | Peripheral direction |
| u | Increase in elevation |
| v | Offset dimension |

What is claimed is:

1. An automatically traveling floor dust collecting appliance comprising:
   at least one running wheel comprising an axis of rotation, a hub, and a tire forming a tire contact area merging radially inwardly into oppositely situated first and second side faces forming a conical opening contour of the tire in an outward direction, wherein the tire comprises an elastic material and profile blocks provided one after the other in a peripheral direction and associated with the first and second side faces respectively, wherein each of the profile blocks forms a respective tire contact area part of the tire contact area having a respective profile sloping downwardly in cross-section toward a center of the tire and forms a respective side face part of the side face associated with the profile block, wherein the profile block, at a first transition between the tire contact area part and the side face part, radially and in a direction of the axis of rotation, forms a farthest protruding portion of the tire contact area of the tire, wherein the profile block merges into a step surface, and wherein the step surface is lowered with respect to the tire contact area for one half to three times of an elevation of the profile starting from the center up to a second transition into the side face associated with the profile block.

2. The floor dust collecting appliance according to claim 1, wherein the center of the tire is in the direction of the axis of rotation and the profile blocks are oppositely situated relative to the center of the tire.

3. The floor dust collecting appliance according to claim 1, wherein each profile block in its cross-section extends from the side face associated with the profile block to the center, or wherein each profile block has a rectangular layout in top view, or wherein the respective side face associated with each profile block extends substantially linearly in cross-section.

4. The floor dust collecting appliance according to claim 1, wherein each profile block has an extent portion, in the direction of the axis of rotation and based on a cross-section, having a clearance from an associated shoulder portion of the hub.

5. The floor dust collecting appliance according to claim 4, wherein the elasticity of the material is selected in such a way that in a load state, when during customary travel of the appliance a portion of the tire contact area formed by the profile block rests on a floor, the extent portion is provided with support by the shoulder portion.

6. The floor dust collecting appliance according to claim 1, wherein an extent of the tire in the direction of the axis of rotation in a region of the profile blocks is determined by twice an extent of two of the profile blocks provided one after the other in a peripheral direction and associated with the first and second side respectively.

7. The floor dust collecting appliance according to claim 1, wherein the tire has a radially inwardly protruding mounting formation on a hub side.

8. The floor dust collecting appliance according to claim 7, wherein the profile block has an extent portion, in the direction of the axis of rotation and based on a cross-section, having a clearance from an associated shoulder portion of the hub and wherein the mounting formation extends in a radially inwardly protruding manner with respect to the extent portion.

9. The floor dust collecting appliance according to claim 1, wherein a mounting receptacle is formed on the hub, and is determined by a groove formed by two circumferential projections separated by a distance in the direction of the axis of rotation.

10. The running wheel for the floor dust collecting appliance according to claim 1.

* * * * *